United States Patent
Tarukawa (10) Patent No.: US 10,330,202 B2
(45) Date of Patent: Jun. 25, 2019

(54) SEALING DEVICE (71) Applicant: NOK CORPORATION, Tokyo (JP)

(72) Inventor: Yuichi Tarukawa, Fukushima (JP)

(73) Assignee: NOK CORPORATION (JP)

( * ) Notice: Subject to any disclaimer, the term of this patent is extended or adjusted under 35 U.S.C. 154(b) by 4 days.

(21) Appl. No.: 15/554,768

(22) PCT Filed: Feb. 26, 2016

(86) PCT No.: PCT/JP2016/055762
§ 371 (c)(1),
(2) Date: Aug. 31, 2017

(87) PCT Pub. No.: WO2016/147835
PCT Pub. Date: Sep. 22, 2016

(65) Prior Publication Data
US 2018/0017164 A1    Jan. 18, 2018

(30) Foreign Application Priority Data

Mar. 18, 2015    (JP) .................................. 2015-054447

(51) Int. Cl.
*F16J 15/32*    (2016.01)
*F16J 15/3232*    (2016.01)
F16C 33/78    (2006.01)

(52) U.S. Cl.
CPC ....... *F16J 15/3232* (2013.01); *F16C 33/7816* (2013.01); *F16C 2326/02* (2013.01)

(58) Field of Classification Search
CPC ............... F16J 15/3232; F16C 33/7816; F16C 2326/02
See application file for complete search history.

(56) References Cited

U.S. PATENT DOCUMENTS 2,316,713 A    4/1943    Procter
8,500,130 B2    8/2013    Sedlar et al.
(Continued)

FOREIGN PATENT DOCUMENTS

CN    87208956 U    6/1988
CN    201269309 Y    7/2009
(Continued)

OTHER PUBLICATIONS

Extended European Search Report for Application No. EP 16 76 4665 dated Mar. 12, 2018 (7 pages).

*Primary Examiner* — Gilbert Y Lee
(74) *Attorney, Agent, or Firm* — Harness, Dickey & Pierce, P.L.C.

(57) ABSTRACT

A sealing device has a main lip sealing sealed fluid in a machine inside and a sub lip preventing intrusion of foreign materials in a machine outside, and structured such that both of the lips slidably come into contact with a peripheral surface of a shaft, wherein the sub lip is formed into a shape which is vertical to an axial direction or a shape which is directed to the main lip side, and a stepped shape is provided in the sub lip, the stepped shape unevenly distributing a generation position of a contact pressure peak in relation to the shaft in the sub lip. The sealing device can achieve both the shaft inserting property and the sealing performance in a sealing device having a main lip which seals sealed fluid in a machine inside, and a sub lip which seals foreign materials in a machine outside.

5 Claims, 8 Drawing Sheets (56) References Cited

U.S. PATENT DOCUMENTS

| | | | | |
|---|---|---|---|---|
| 2007/0052180 A1* | 3/2007 | Watanabe | ............. | F16J 15/322 |
| | | | | 277/551 |
| 2009/0152779 A1* | 6/2009 | Imoto | ...................... | F16F 9/36 |
| | | | | 267/129 |
| 2010/0052266 A1 | 3/2010 | Tanida et al. | | |
| 2014/0339775 A1* | 11/2014 | Yarimizu | ................. | F02F 7/00 |
| | | | | 277/353 |
| 2015/0276059 A1* | 10/2015 | Nakagawa | ............. | F16J 15/164 |
| | | | | 277/351 |
| 2015/0285380 A1* | 10/2015 | Nakagawa | ............. | F16J 15/164 |
| | | | | 277/351 |

FOREIGN PATENT DOCUMENTS

| | | |
|---|---|---|
| CN | 101849124 A | 9/2010 |
| CN | 102003467 A | 4/2011 |
| CN | 102575774 A | 7/2012 |
| CN | 204061568 U | 12/2014 |
| DE | 10-2013-216773 A1 | 2/2015 |
| EP | 1 384 923 A1 | 1/2004 |
| EP | 1983238 A1 | 10/2008 |
| JP | H06-41018 Y2 | 10/1994 |
| JP | 2008-267499 A | 11/2008 |
| WO | WO-2012-125992 A1 | 9/2012 |

* cited by examiner

SEALING DEVICE

CROSS-REFERENCE TO RELATED APPLICATIONS

This application is a U.S. National Stage Application of International Application No. PCT/JP2016/055762, filed on Feb. 26, 2016, and published in Japanese as WO 2016/147835 A1 on Sep. 22, 2016 and claims priority to Japanese Application No. 2015-054447, filed on Mar. 18, 2015. The entire disclosures of the above applications are incorporated herein by reference.

BACKGROUND OF THE INVENTION

Field of the Invention

The present invention relates to a sealing device according to a sealing technique. The sealing device according to the present invention is used, for example, for sealing a bearing lubricating grease in a hub bearing in a vehicle such as a motor vehicle. Further, the sealing device according to the present invention is used in a field of a general industrial machinery, an agricultural machinery or a construction machinery, in addition to a vehicle relevant field.

Description of the Conventional Art

Figure 5:
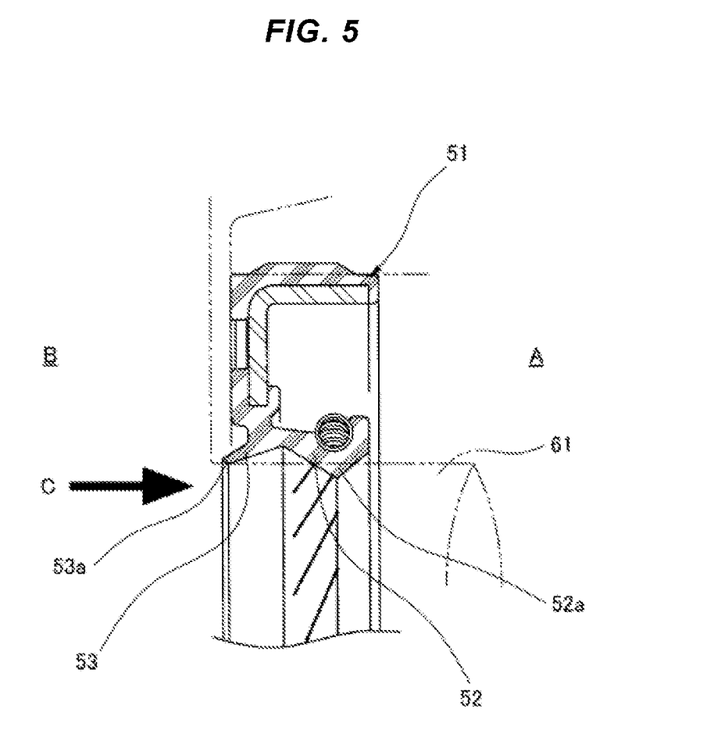
FIG. 5 is a cross sectional view of a substantial part of a sealing device according to a prior art.

Conventionally, there has been known a sealing device 51 having a main lip (a seal lip) 52 which seals a sealed fluid (a grease) in a machine inside A as shown in FIG. 5, and the sealing device 51 is provided with a sub lip (a dust lip) 53 preventing intrusion of foreign materials (dust or muddy water) in a machine outside B in conjunction therewith (refer to FIG. 3 of Japanese Unexamined Patent Publication No. 2008-267499).

The main lip 52 is formed into a shape which is directed to the machine inside A side when being installed, and seals the sealed fluid by a lip end 52a thereof slidably coming into contact with a peripheral surface of a shaft 61 while being exposed to a pressure of the sealed fluid. On the other hand, the sub lip 53 is formed into a shape which is directed to the machine outside B side contrarily, and prevent intrusion of the foreign material by a lip end 53a thereof slidably coming into contact with the peripheral surface of the shaft 61.

Since the sealing device 51 in FIG. 5 has the dedicated sub lip 53 preventing the intrusion of the foreign materials in the machine outside B in addition to the main lip 52 sealing the sealed fluid in the machine inside A, the sealing device 51 can effectively inhibit the foreign materials in the machine outside B from entering into the machine inside A, however, there is further room for improvement in the following point.

More specifically, in the case that insertion (assembly) of the shaft 61 is carried out relatively from the sub lip 53 side (the machine outside B side) in relation to the sealing device 51 according to the structure of the actual device to which the sealing device 51 is installed (a shaft inserting direction is denoted by an arrow C), and the shaft is inserted with great eccentricity, the shaft 61 widely interferes with the sub lip 53 circumferentially in a part in the eccentricity side when the shaft is inserted. Therefore, a turn-up phenomenon (a phenomenon that the lip end 53a is inverted) is generated in the sub lip 53. As a result, a contact posture of the sub lip 53 with the shaft 61 becomes unstable. Then, the sealing performance achieved by the sub lip 53 is lowered.

Figure 6:
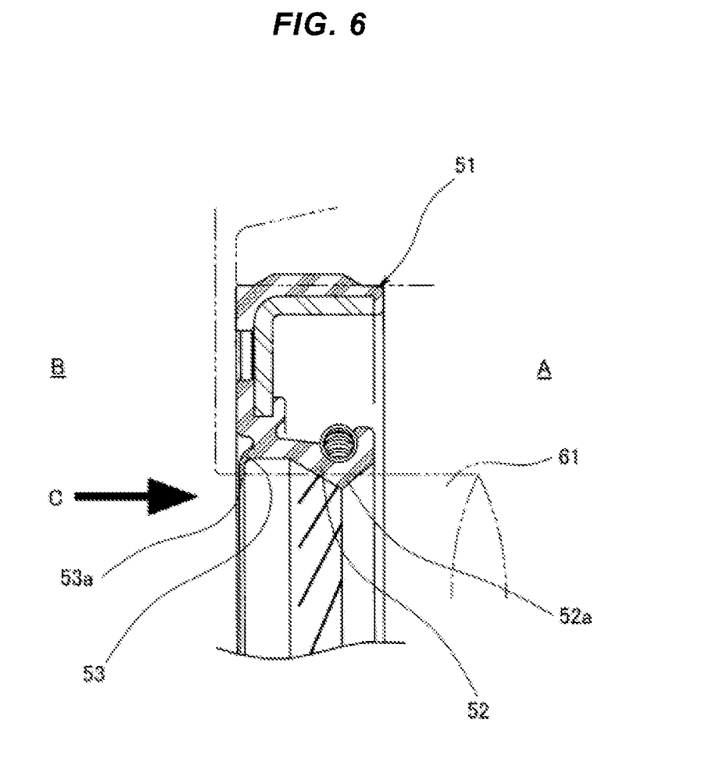
FIG. 6 is a cross sectional view of the substantial part of the sealing device according to the prior art.
Figure 7:
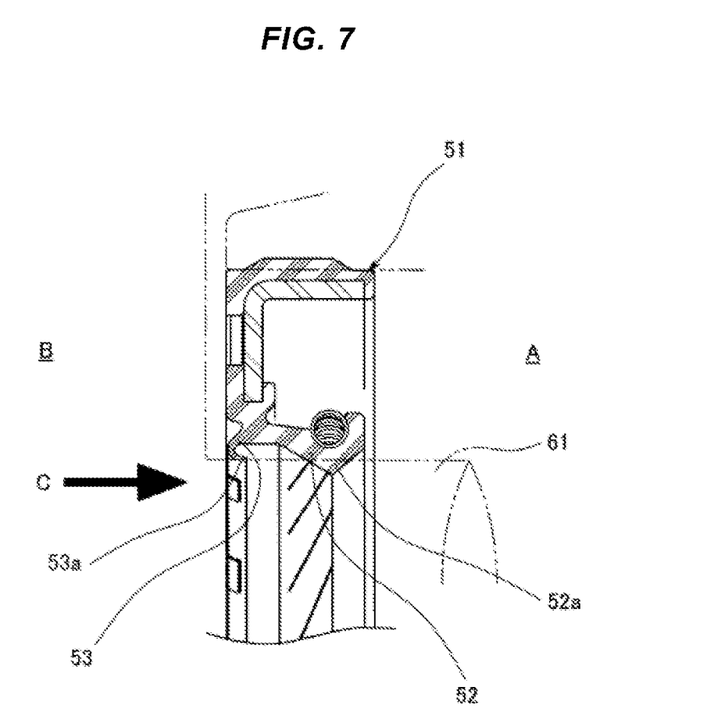
FIG. 7 is a cross sectional view of the substantial part of the sealing device according to the prior art.

In order to suppress the generation of the turn-up phenomenon in the sub lip 53, it can be thought to previously form the shape of the sub lip 53 into a vertical shape in an axial direction of the shaft (a shape which is directed to an inner side in a diametrical direction and is vertical to the shaft) as shown in FIG. 6, or to previously form the shape of the sub lip 53 into a shape which is directed to the main lip 52 side (the machine inside A side).

Figure 8:
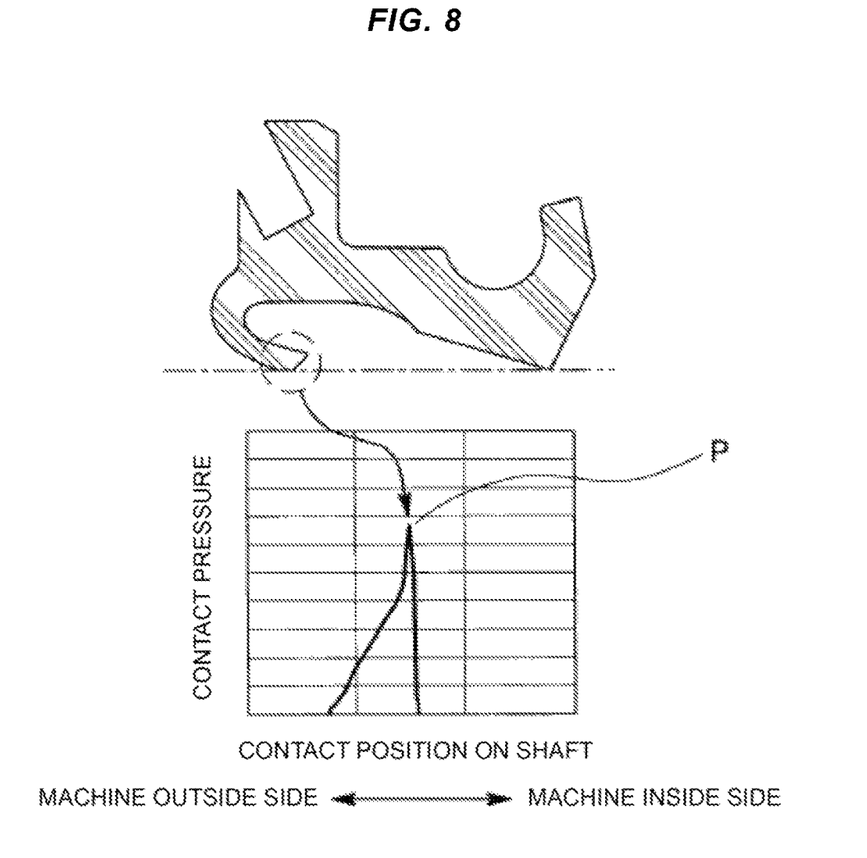
FIG. 8 is an explanatory view of a contact pressure distribution in a sub lip according to the prior art.

However, in these cases, the turn-up phenomenon is not generated in the sub lip 53, but a position where a contact pressure peak is generated in the sub lip 53 is arranged close to the main lip 52 (close to the machine inside A) as shown in FIG. 8. Therefore, the sealing performance achieved by the sub lip 53 is lowered.

Therefore, it has been conventionally hard to achieve both the shaft inserting property and the sealing performance.

The present invention is made by taking the above points into consideration, and an object of the present invention is to achieve both the shaft inserting property and the sealing performance in a sealing device having a main lip which seals sealed fluid in a machine inside, and a sub lip which seals foreign materials in a machine outside.

SUMMARY OF THE INVENTION

In order to achieve the above object, the sealing device according to the present invention is a sealing device having a main lip which seals sealed fluid in a machine inside and a sub lip which prevents intrusion of foreign materials in a machine outside, and structured such that both the lips slidably come into contact with a peripheral surface of a shaft, wherein the sub lip is formed into a shape which is vertical to an axial direction of the shaft or a shape which is directed to the main lip side, and a stepped shape is provided in the sub lip, the stepped shape unevenly distributing a generation position of a contact pressure peak in relation to the shaft in the sub lip.

In the present invention having the structure mentioned above, the sub lip is not formed into the shape which is directed to the machine outside side, but is formed into the shape which is vertical to the axial direction of the shaft or the shape which is directed to the main lip side (the machine inside side). As a result, the turn-up phenomenon is not generated in the sub lip even if the insertion (assembly) of the shaft is carried out relatively from the sub lip side (the machine outside side) in relation to the sealing device.

Further, the stepped shape is provided additionally in the sub lip, and the generation position of the contact pressure peak in relation to the shaft in the sub lip is unevenly distributed to the machine outside. Therefore, it is possible to improve the sealing performance of the sub lip in comparison with the case that the generation position of the contact pressure peak in relation to the shaft in the sub lip is unevenly distributed to the machine inside.

As mentioned above, according to the present invention, it is possible to achieve both the shaft inserting property and the sealing performance.

As the stepped shape, a projection having a triangular cross section is preferably provided in a contact portion in the sub lip with the shaft. According to this structure, an inclined surface (a taper surface) is formed by an oblique line (a slope) in the machine inside side (the main lip side) in the triangle, the inclined surface being structured such that an inner diameter in a contact state is enlarged little by little from the machine outside side toward the machine inside side. Therefore, the contact pressure in the inclined surface is reduced little by little from the machine outside side toward the machine inside side. As a result, it is possible to unevenly distribute the generation position of the contact pressure peak to the machine outside.

Effect of the Invention

According to the present invention, it is possible to achieve both the shaft inserting property and the sealing performance in the sealing device having the main lip which seals the sealed fluid in the machine inside, and the sub lip which seals the foreign materials in the machine outside.

DETAILED DESCRIPTION OF PREFERRED EMBODIMENT

Next, a description will be given of an embodiment according to the present invention with reference to the accompanying drawings.

Figure 1:
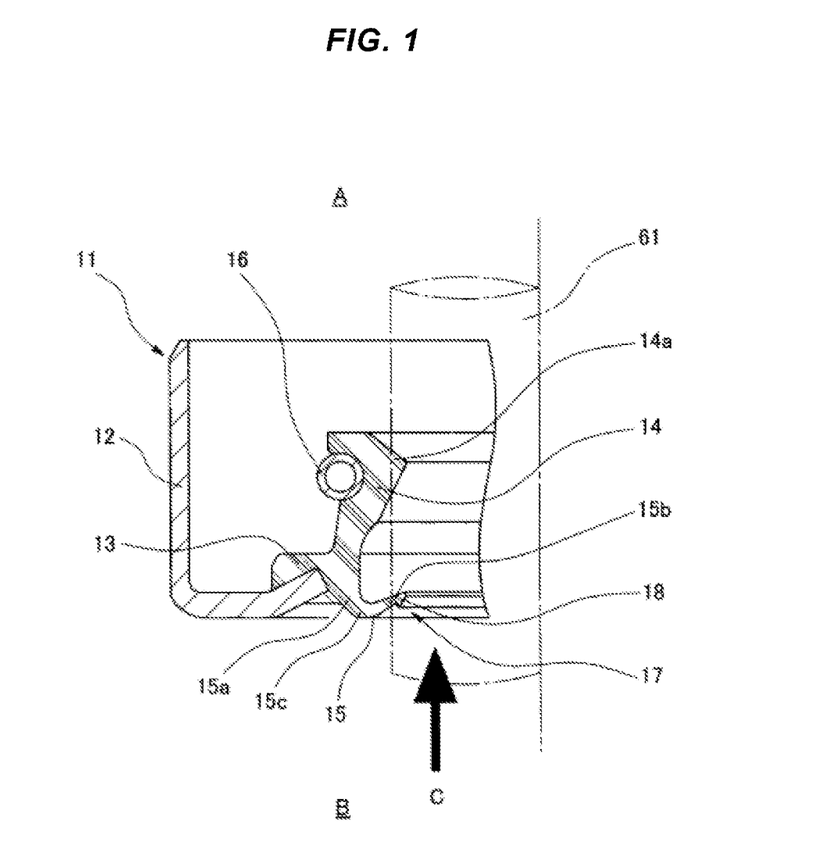
FIG. 1 is a cross sectional view of a substantial part of a sealing device according to an embodiment of the present invention.

FIG. 1 shows a cross section of a substantial part of a sealing device 11 according to an embodiment of the present invention. The sealing device 11 according to the embodiment is used as an inner seal in a hub bearing portion of a truck so as to prevent foreign materials (dusts and muddy water) in a machine outside (an outer portion of the machine) B from intruding into a machine inside (an inner portion of the machine) A as well as inhibiting sealed fluid (grease) in the machine inside A from leaking to the machine outside B.

The sealing device 11 is provided with a metal ring 12, and a rubber-like elastic body 13 which is bonded (vulcanization adhesion) to the metal ring, and a main lip (a seal lip) 14 and a sub lip (a dust lip) 15 are integrally formed by the latter rubber-like elastic body 13, the main lip 14 sealing the sealed fluid in the machine inside A, and the sub lip 15 sealing the foreign materials in the machine outside B.

The main lip 14 is formed into a shape that a lip end 14a thereof is directed to the machine inside A side when the sealing device 11 is installed to a shaft peripheral portion of the machine, and the lip end 14a slidably comes into contact with a peripheral surface of the shaft 61 while receiving the pressure of the sealed fluid, thereby sealing the sealed fluid. A garter spring 16 is fitted to the main lip 14.

On the other hand, the sub lip 15 is also formed into a shape that a lip end 15b thereof is directed to the machine inside A side (the main lip 14 side) when the sealing device 11 is installed to the shaft peripheral portion of the machine, and the lip end 15b slidably comes into contact with the peripheral surface of the shaft 61, thereby preventing the intrusion of the foreign materials.

The sub lip 15 has a curved portion 15c with a circular arc cross sectional shape between the base end portion 15a and the lip end (a leading end portion) 15b as well as having the base end portion 15a and the lip end (the leading end portion) 15b. As a result, a position from the base end portion 15a to the curved portion 15c is set to a position toward a diagonally outer side which is directed to the machine outside B side and an inner side in a diametrical direction, and a position from the curved portion 15c to the lip end 15b is set to a position toward a diagonally inner side which is directed to the machine inside A side and the inner side in the diametrical direction. Therefore, the sub lip 15 is formed as a seal lip having an inverted shape which is inverted by the curved portion 15c.

Further, the sub lip 15 is provided with a stepped shape 17 which unevenly distributes a generation position of a contact pressure peak in the sub lip 15 in relation to the shaft 61 to the machine outside B side.

The stepped shape 17 is structured as follows.

Figure 2:
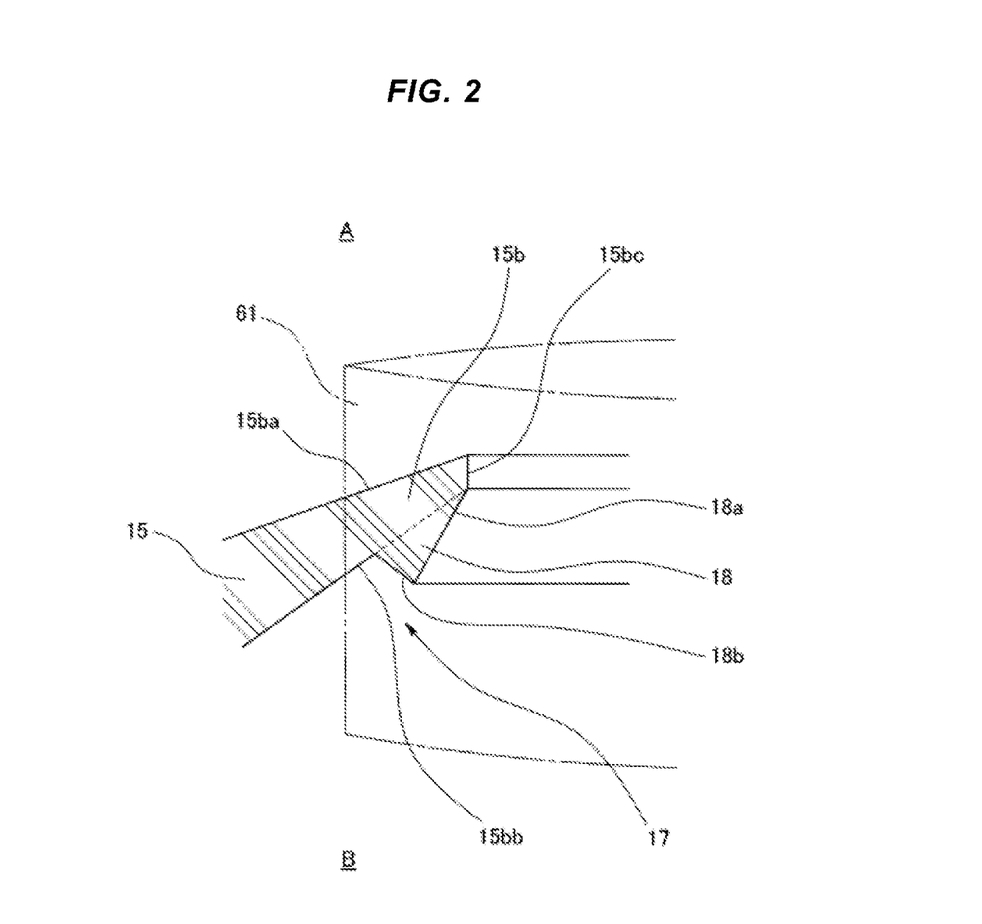
FIG. 2 is an enlarged cross sectional view of a substantial part and shows a state of a sub lip provided in the sealing device before insertion of a shaft.
Figure 3:
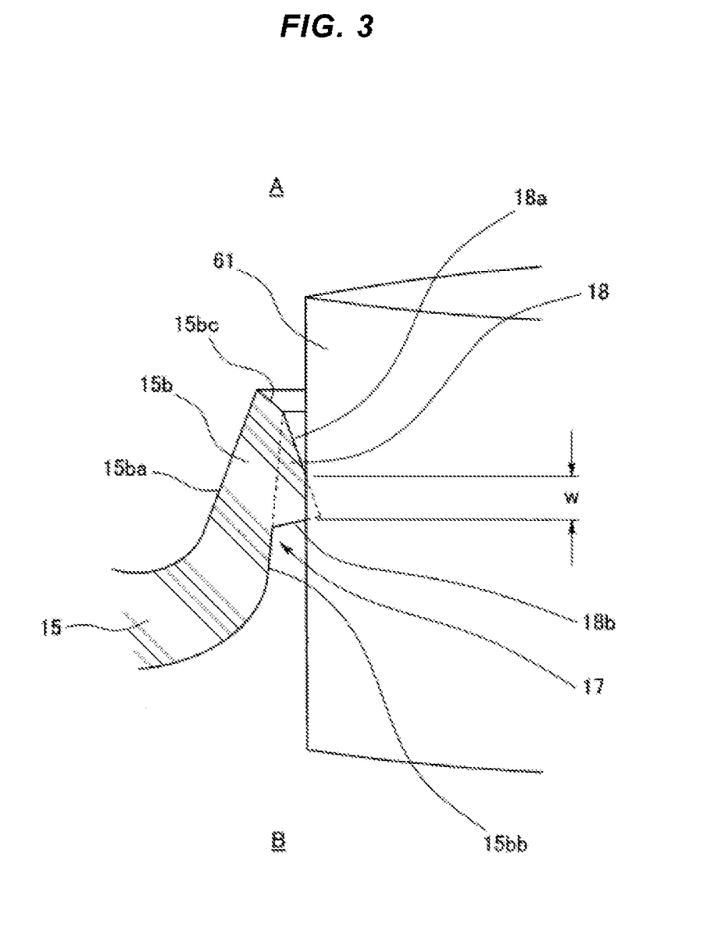
FIG. 3 is an enlarged cross sectional view of the substantial part and shows a state of the sub lip after the insertion of the shaft.

More specifically, the lip end 15b of the sub lip 15 has three surfaces including a surface 15ba in the machine inside A side, and a surface 15bb and a thickness surface 15bc in the machine outside B side, as shown in FIG. 2 in an enlarged manner under a lip free state before insertion of the shaft. The surface 15bb in the machine outside B side among them is formed as a surface which faces to the peripheral surface of the shaft 61 and comes into contact with the peripheral surface of the shaft 61 after the insertion of the shaft, and an annular projection 18 formed into a triangular cross section is integrally provided in a leading end portion of the surface 15bb in the machine outside B side, as shown in FIG. 3. The stepped shape 17 is set by the provision of the projection 18 as mentioned above.

The projection 18 comes into contact with the peripheral surface of the shaft 61 at a predetermined contact width w in an axial direction of the shaft as shown in FIG. 3.

Figure 4:
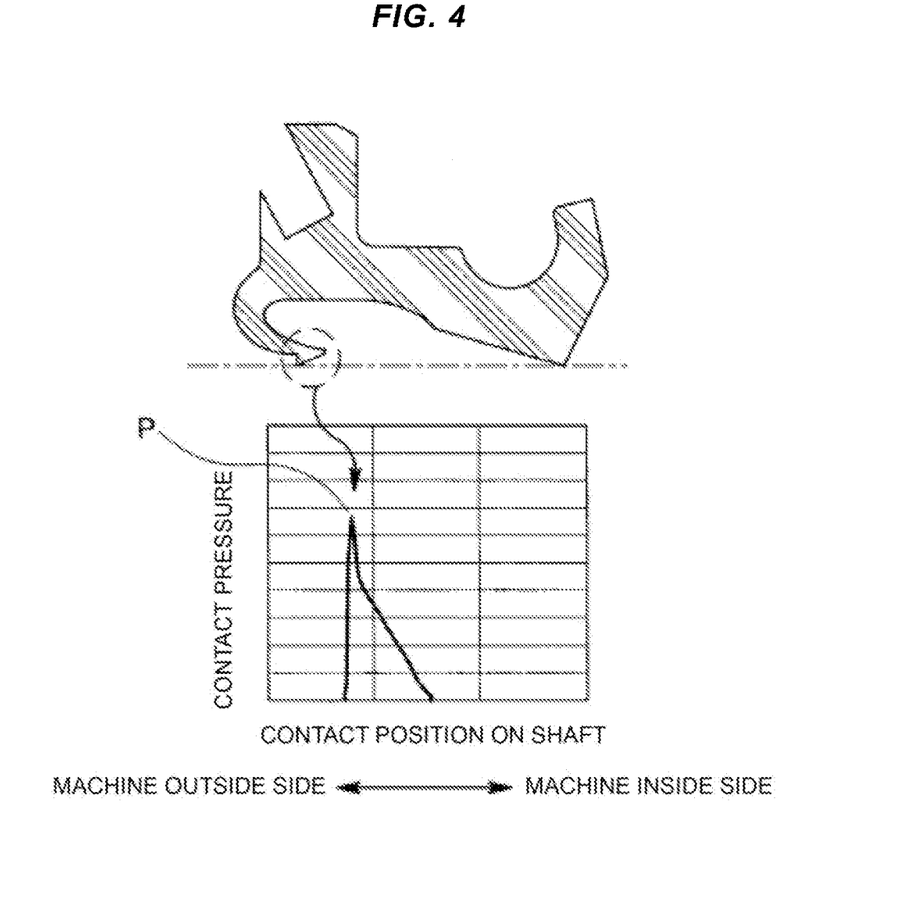
FIG. 4 is an explanatory view of a contact pressure distribution in the sub lip.

Further, the annular projection 18 formed into the triangular cross section has a slope 18a in the machine inside A side and a slope 18b in the machine outside B side, and the slope 18a in the machine inside A side among them is formed into an inclined surface (a taper surface) in which an inner diameter in a contact state is enlarged little by little from the machine outside B side toward the machine inside A side. As shown in FIG. 4, the contact pressure in the inclined surface is set to become smaller little by little from the machine outside B side toward the machine inside A side. As a result, the generation position of the contact pressure peak P can be unevenly distributed to the machine outside B within the contact width w mentioned above.

In the sealing device 11 having the structure mentioned above, the lip end 15b of the sub lip 15 is not formed into the shape which is directed to the machine outside B side, but is formed into the shape which is directed to the machine inside A side (the main lip 14 side). Therefore, any turn-up phenomenon is not generated in the sub lip 15 even if the insertion of the shaft 61 to the sealing device 11 is carried out relatively from the sub lip 15 side (the shaft inserting direction is denoted by the arrow C in FIG. 1).

Further, the stepped shape 17 is additionally provided in the sub lip 15 and the generation position of the contact pressure peak P in relation to the shaft 61 in the sub lip 15 is unevenly distributed to the machine outside B. Therefore, it is possible to improve the sealing performance of the sub lip 15 in comparison with the case that the generation position of the contact pressure peak P in relation to the shaft 61 in the sub lip 15 is unevenly distributed to the machine inside A.

As a result, according to the sealing device 11 having the structure mentioned above, it is possible to improve the shaft inserting property since any turn-up phenomenon is not generated in the sub lip 15. In addition, it is possible to improve the sealing performance since the sub lip 15 achieves an excellent sealing performance. Therefore, the sealing device 11 can achieve both the shaft inserting property and the sealing performance.

What is claimed is:

1. A sealing device comprising:
   a main lip which seals sealed fluid in a machine inside;
   a sub lip which prevents intrusion of foreign materials in a machine outside; and
   both the lips slidably coming into contact with a peripheral surface of a shaft,
   wherein a stepped shape is provided in the sub lip, the stepped shape unevenly distributing a generation position of a contact pressure peak in relation to the shaft in the sub lip to the machine outside, and
   wherein the sub lip includes a base end that extends axially away from the main lip, a curled portion connected to the base end that curls back toward the main lip, and a lip end that is connected to the curled portion and includes the stepped shape.

2. The sealing device according to claim 1, wherein the stepped shape is provided as a projection having a triangular cross section and provided in a contact portion in the sub lip with the shaft.

3. The sealing device according to claim 1, further comprising an elastic body that comprises each of the main lip and the sub lip, a surface of the elastic body that faces the shaft connecting the main lip to the sub lip, and a surface of the elastic body that faces away from the shaft including the stepped shape.

4. The sealing device according to claim 3, wherein the curled portion curls the sub lip back toward the main lip such that the stepped shape of the sub lip is configured to contact the shaft.

5. The sealing device according to claim 3, wherein the stepped shape includes a first surface that extends outward from the surface of the elastic body that faces away from the shaft, a second surface connected to the first surface that extends back toward the surface of the elastic body that faces away from the shaft, and a third surface connected to the second surface and the surface that faces the shaft.

* * * * *